United States Patent [19]

André et al.

[11] 3,968,225

[45] July 6, 1976

[54] PREPARATION OF SPHEROIDAL ALUMINA PARTICLES

[75] Inventors: Jacques Maurice Jules Ghislain André; Raymond Mark Cahen, both of Brussels; Henri Robert Debus, Meise; René Odon Lammers, Brussels; Hugo Johannes van Thillo, Grimbergen, all of Belgium

[73] Assignee: Labofina S.A., Brussels, Belgium

[22] Filed: Feb. 10, 1975

[21] Appl. No.: 548,217

[30] Foreign Application Priority Data

Feb. 18, 1974 Luxemburg .............................. 69408

[52] U.S. Cl. ................................. 423/626; 423/625; 423/628; 423/630; 423/631; 252/463; 252/448; 252/465; 252/466 R
[51] Int. Cl.² ............................................ C01F 7/02
[58] Field of Search ........... 423/628, 630, 625, 631, 423/626; 252/448; 264/15

[56] References Cited
UNITED STATES PATENTS

| | | | |
|---|---|---|---|
| 2,672,452 | 3/1954 | Wankat | 252/448 |
| 2,955,915 | 10/1960 | Bicek | 423/630 |
| 3,290,122 | 12/1966 | Clinton et al. | 252/448 |
| 3,353,910 | 11/1967 | Cornelius et al. | 423/628 |
| 3,416,888 | 12/1968 | Notari | 423/628 |
| 3,464,928 | 9/1969 | Mathies | 252/448 |
| 3,558,508 | 1/1971 | Keith et al. | 252/448 |
| 3,600,129 | 8/1971 | Vesely et al. | 252/448 |
| 3,746,659 | 7/1973 | Horzepa | 252/448 |
| 3,758,418 | 9/1973 | Leonard et al. | 423/630 |
| 3,776,987 | 12/1973 | Grimes et al. | 252/448 |

*Primary Examiner*—Herbert T. Carter

[57] ABSTRACT

A process for preparing aluminium oxide beads from alumina hydrogel, which comprises polymerizing, in a hot and substantially water-immiscible fluid, an aqueous mixture comprising alumina hydrogel and alumina hydrosol and a water-soluble monomer whose uncross-linked polymer is water-soluble or forms a gel, this mixture being dispersed as droplets into a hot fluid in which substantial polymerization of the monomer occurs.

10 Claims, No Drawings

PREPARATION OF SPHEROIDAL ALUMINA PARTICLES

BACKGROUND OF THE INVENTION

The present invention relates to a process for preparing substantially spheroidal alumina particles. The present invention also relates to a process for preparing catalysts from these spheroidal alumina particles.

Metallic oxides, and particularly alumina, are widely used in the chemical industry, typically as catalysts, catalyst supports, absorbing agents, etc. For the most of these applications, these oxides preferably are used in the form of spheroidal particles or beads. Among the main advantages of these particles are better wear and crushing strength. These particles may be more regular distributed into the reactors, thereby reducing the pressure drop variations of the reactants passing through the reactors.

Several processes have been proposed for preparing spheriodal alumina particles. One of such processes includes dispersing an alumina hydrosol as droplets in a medium where gelation occurs, and thereafter, subjecting the resulting beads which are obtained in the form of alumina hydrogel, to one or more aging treatments in order to obtain beads having a suitable mechanical resistance. According to another known process, an alumina hydrosol is mixed with an ammonium salt and a synthetic polymer or a natural gum and the resulting mixture dispersed into a water-immiscible medium and thereafter subjecting to an aging treatment. However, these processes have the disadvantage of requiring very long treatment times which render them uneconomic. Moreover, alumina beads prepared by some of these known processes contain high amounts, even excessive amounts on occasion, of impurities which are undesirable when these beads are used as catalysts or catalyst supports.

An object of the present invention is to provide a new and improved method for preparing spheroidal alumina particles.

A further object of the present invention is the preparation of particles whose catalytic activity is not inhibited by impurities.

Still another object of the present invention is to provide a new and improved process for preparing particles having a uniform size.

A remaining object of the present invention is to provide a process which allows the preparation of smooth surfaced alumina beads having a high resistance to crushing. Additional objects will become apparent from the following description of the invention herein disclosed.

SUMMARY OF THE INVENTION

The present invention is a process for producing aluminium oxide beads from alumina hydrogel which comprises polymerizing, in a hot and practically water-immiscible fluid, an aqueous mixture which essentially contains alumina hydrogel and alumina hydrosol and at least a water-soluble monomer whose uncross-linked polymer is water-soluble or forms a gel, this mixture being dispersed as droplets into a hot fluid in which substantial polymerization of the monomer occurs. More particularly, the process of the invention comprises producing an aqueous mixture which comprises alumina hydrogel and alumina hydrosol and a water soluble monomer whose uncross-linked polymer is water soluble or forms a gel, this aqueous mixture being dispersed as droplets into a hot and practically water-immiscible fluid, substantially polymerizing said monomer contained in each droplet of aqueous mixture, and recovering beads constituted of alumina hydrogel and hydrosol agglomerated by the polymer, and drying and calcining said beads to obtain alumina beads.

Another embodiment of the process of the present invention comprises preparing an aqueous mixture containing from 5 to 30% by weight (based on metallic oxide) of alumina hydrogel and alumina hydrosol, 0.25 to 20% by weight of a water-soluble ethylenically unsaturated monomer whose uncross-linked polymer is water-soluble or forms a gel, and 0.05 to 2% by weight of a polymerization catalyst, dispersing this aqueous mixture, as droplets, into a water-immiscible fluid having a temperature of 50° to 105°C, at atmospheric pressure, maintaining the droplets in this fluid until beads are formed and become hard, and recovering, drying and calcining the beads.

DESCRIPTION OF THE PREFERRED EMBODIMENTS

For the application of the process of the invention, alumina hydrogel is used in a finely divided form in order to ensure ready dispersion into the starting aqueous mixture. Alumina hydrogel may be prepared by any known method and preferably by treating aluminium sulphate with a base, or by hydrolysing aluminium isopropylate or by treating an alkali aluminate with an acid or with aluminium sulphate. The precipitate obtained is waterwashed and optionally may be dried.

The exact composition of alumina hydrosols is not fixed. The hydrosols may be prepared from aluminium bromide, aluminium sulphate, aluminium alcoholate or preferably from aluminium chloride, or by digesting metallic aluminium in hydrochloric acid or in hydrated aluminium chloride. In the latter case, it may be considered that the hydrosols have the following formula:

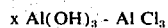

$$x\ Al(OH)_3 - Al\ Cl_3$$

wherein $x$ is an integer between 4 and 6. The terms "alumina hydrogel" and "alumina hydrosol" include not only these compounds in pure state but also these compounds containing a low amount of silica or silicate or similar material.

The starting aqueous mixture must remain sufficiently free flowing at room temperature to allow an easy dispersion thereof in the form of droplets into the polymerization mixture. In order to avoid excessive investment and drying costs of the beads obtained by the process, too dilute solutions of the starting aqueous mixture are to be avoided. Preferably, the aqueous mixtures which are used contain in a finely divided form, from 5 to 30% by weight of alumina hydrogel and hydrosol (based on dry aluminium oxide). In some cases, when an acid monomer is used, the aqueous mixture of alumina hydrogel and hydrosol becomes thixotropic or may be thickened with the formation of an irreversible gel. This stiffening (which does not result from a polymerization of the monomer) may be avoided by subjecting the aqueous mixture to a vigorous stirring. Advantageously, starting aqueous mixtures may be used containing no more than 10 to 20% by weight of alumina hydrogel and hydrosol (based on aluminium oxide). When basic monomers are used, the alumina hydrogel and hydrosol content in the starting aqueous mixture may be higher, but without exceeding about 30% by weight (based on $Al_2O_3$).

In the starting aqueous mixture, the weight ratio of alumina hydrogel to alumina hydrosol may vary between wide limits, generally, however, between 99 : 1 and 50 : 50 and more particularly, between 85 : 15 and 55 : 45, the weights of hydrogel and hydrosol being based on $Al_2O_3$. A preferred embodiment for preparing the starting aqueous mixture comprises digesting hydrogel into hydrosol, this treatment being accelerated by increasing temperature. The hydrogel plus hydrosol ratio, to the extent the aqueous mixture remains sufficiently free flowing to be easily dispersed in finely divided droplets into the polymerization mixture. Those skilled in the art may readily determine the optimum conditions for obtaining such fluid mixture in view of the teachings herein.

The water-soluble monomer whose uncross-linked polymer is water-soluble or forms a gel is selected from the group consisting of ethylenically unsaturated compounds comprising acrylic compounds of the general formula

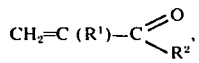

wherein $R^1$ is H or a methyl radical and $R^2$ is a $-OR^3$, $-NR^3$ or $-NR^3R^4$ radical with $R^3$ and $R^4$ in such radical being H or a hydrophilic radical, particularly a hydroxyalkyl radical containing from 1 to 2 carbon atoms or a methoxy methyl radical. Non-limiting examples of such compounds are acrylic acid, methacrylic acid, acrylamide, methacrylamide, N-hydroxymethylacrylamide, N-hydroxymethylmethacrylamide, N-methoxymethylacrylamide, N-methoxymethylmethacrylamide, ethyleneglycol monoacrylate, ethyleneglycol monomethacrylate and the like. The choice of the monomer depends primarily on economic conditions, and, for that reason, acrylic acid, methacrylic acid, acrylamide and mixtures thereof preferably are used. Reference to the term "water-soluble monomer whose uncross-linked polymer is water-soluble or forms a gel" also shall include ethylenically unsaturated monomers containing a greater part of monomers whose uncross-linked polymers are water-soluble and a lesser part of monomers whose uncross-linked polymers are water-insoluble.

The amount of monomer used depends on many factors, such as amounts of alumina hydrogel and hydrosol, monomer type, desired apparent density for the final calcined beads, etc. Generally, the amount of such monomer is between 0.25 and 20% by weight of aqueous mixture. It has been observed that the behavior of the beads obtained by the process of the present invention depends on the respective amounts of alumina hydrogel and hydrosol (based on oxide). Preferably, the monomer is used in an amount corresponding to about 5 to 150% of the alumina hydrogel plug hydrosol weight (based on oxide). Higher amounts of monomers may cause a disaggregation of the beads when these latter are subjected to calcination. Too low an amount of monomer results in the production of beads which are not readily workable and not very firm. In order to obtain beads which, after calcination, present interesting properties with regard to density and mechanical strength, an aqueous mixture is used wherein the amount of monomer corresponds to about 5 to 75% by weight of alumina hydrogel plus hydrosol (based on oxide).

The starting mixture is dispersed into a substantially water-immiscible fluid, having a temperature between about 50° and 105°C, at atmospheric pressure. Preferably, the aqueous mixture is introduced with the aid of calibrated orifices or nozzles in order to obtain a subdivision of said mixture in the form of droplets which are dispersed into the fluid. The residence-time of the droplets in the fluid must be sufficient to permit the polymerization of monomers. This water-immiscible fluid may be a gas, such as dry air, which is introduced into a tower in counter-current flow to the droplets of the starting mixture. Another advantageous embodiment of the invention is the using, as such fluid, of a water-immiscible liquid. This liquid may have a density higher than that of the beads to be prepared. In such case, the starting aqueous mixture is introduced as droplets at the bottom of a column containing the liquid and the beads formed are then recovered on the surface of the liquid. Another embodiment consists in using a liquid medium whose density is lower than that of the beads such as a mineral oil. A generally used such technique is described in U.S. Pat. No. 2,620,314. Such technique consists in using a column filled with hot oil in which droplets of an aqueous mixture are let to fall, the residence-time of the droplets in the oil being sufficient to allow the polymerization of the polymer. Temperature of the liquid is at least equal to about 50°C in order to reduce the polymerization time. Temperatures higher than about 105°–110°C result in evaporation of water and a disaggregation of beads unless the process is carried out under pressure. According to a preferred embodiment, the temperature of the water-immiscible liquid is between 75° and 100°C, at atmospheric pressure.

In order to reduce the time needed for the beads to form, it is advantageous to use means for promoting the polymerization of the monomers. Free radical catalysis techniques with peroxidic compounds are particularly useful, particularly the redox system catalysis, which consists of using as catalyst a combination of a peroxidic compound and a reducing agent. Persulphuric acid, hydrogen peroxide, perboric acid and their salts, particularly sodium, potassium or ammonium persulphates and the water-soluble peracids, such as peracetic acid, are examples of useful peroxidic compounds. Reducing agents may be selected from the group consisting of sodium thiosulphate, sodium hyposulphite or dithionite, sodium or potassium bisulphite, N,N,N',N'-tetramethylene-diamine, sodium formaldehydrosulfoxylate, hydrazine, ascorbic acid, etc. A part of the reducing agent may be introduced into the starting aqueous mixture, the other part being added into the water-immiscible fluid in which the polymerization is performed to the extent such reducing agent is soluble in the fluid. It may also be added into the vessel in which the beads are recovered.

The term "polymerization catalyst", as used herein, includes the peroxidic compound when this latter is used with or without reducing agent. The amount of polymerization catalyst can vary widely and depends on the inhibitor content of the monomers used. Generally, the amount of polymerization catalyst is between about 0.05 and 2% by weight of the aqueous mixture when the monomers are substantially free from inhibitors.

The mixture subjected to polymerization may contain a cross-linking agent which has functional groups so that the polymer chains are linked together and form a three dimensional structure. Cross-linking agents may be 1,3-di(acryl- or methacryl-amidomethyl)-2-imidazolidone, hexahydrotriacryloyltriazine, N,N'-methylidene-bis-acrylamide and alkylidene-bis-acrylamides, such as N,N'-methylene-bis-acrylamide and N,N'-ethylidene-bis-acrylamide when the acrylic monomer used has an amide group, an aldehydic compound may be used as cross-linking agent, such as formaldehyde and glyoxal. Glyoxal reacts with a part of acrylamide to form N,N-dihydroxyethylene-bis-acrylamide. It is not necessary to add a cross-linking agent when the acrylic monomers are in an acid medium, but it may be useful to reduce attrition of the beads formed. The amount of cross-linking agent does not generally exceed 1% of the weight of the aqueous mixture, although higher amounts may be used, but without any significant advantage.

The beads obtained are subjected to a thermal treatment, particularly a drying step at a temperature of about 110°C. When used as catalysts or catalyst supports, the beads are calcined by progressively increasing the temperature up to about 400° to 800°C, preferably 500° to 700°C. During this calcination the organic matter contained in the beads is destroyed and finally beads consisting of firmly agglomerated alumina are obtained. The substantially pure alumina beads obtained after calcination are characterized by a remarkable hardness and are particularly convenient used as catalysts or catalyst supports.

The present invention also relates to a process for preparing catalysts in the form of hard beads, these catalysts consisting of alumina impregnated with an active catalyst constituent consisting of a catalytic metallic compound or metal. Any known method may be applied to prepare these catalysts. However, according to a preferred embodiment of the invention, impregnation is with a solution of one or more compounds which generate a catalytic constituent by thermal or chemical treatment. Examples of generating compounds are ammonium molybdate, ammonium chromate, chromium oxalate, zinc carbonate, cobalt acetate, nickel nitrate, nickel chloride, chloro-platinic acid, platinium-tetramine chloride [Pt(NH$_3$)$_4$] Cl$_2$H$_2$O, ammonium platinium-chloride (NH$_4$)$_2$[PtCl$_4$] and the like.

Impregnation of alumina beads with the solution of the catalytic agent generating compound may be performed either before or after drying and calcination of the beads. After impregnation, the beads are dried again and if necessary, are calcined at a temperature of about 400° to 800°C, preferably 500° to 700°C. On occasion, it may be preferable to perform impregnation of alumina beads already dried and calcined, this method allowing preparation of catalysts containing precise amounts of the active catalytic constituent.

The following examples are presented to illustrate the present invention but are not to be considered as limiting. Except as otherwise may be specifically stated, the percentages indicated in the examples are expressed by weight. In the examples, the mechanical resistance of the beads is expressed by the crushing resistance measured with the Tablet Hardness Tester apparatus (of Manestry Machines Ltd, Liverpool, Great Britain in which the bead is placed between two plates, one of which is fixed and the other moves for increasing weight. The mechanical resistance values given in the examples are the average values of experiments performed on five beads.

EXAMPLE 1

Alumina hydrogel was prepared by treating aluminium sulphate with caustic soda up to pH 9. The gel obtained was purified by several waterwashes, thereafter dried at 110°C, crushed and sieved. Alumina hydrosol was prepared by digesting aluminium turnings into aqueous aluminium chloride. Thereafter, water, the alumina hydrogel and the alumina hydrosol were mixed and the resulting mixture heated at 95°C, with stirring for one hour. After cooling, evaporated water was replaced and the mixture was subjected to a vigorous stirring. Acrylic acid, dihydroxyethylene-bis-acrylamide, ammonium persulphate and sodium bisulphite were then added. The final aqueous mixture had the following composition:

| | |
|---|---|
| alumina hydrogel | 8% (based on Al$_2$O$_3$) |
| alumina hydrosol | 2% (based on Al$_2$O$_3$) |
| acrylic acid | 0.48% |
| dihydroxyethylene-bis-acrylamide | 0.023% |
| ammonium persulphate | 0.4% |
| sodium bisulphite | 0.04% |

This mixture was injected dropwise into the beads of a column containing paraffinic oil heated at 95°C. Beads were recovered at the bottom of the column. The beads were aged in a 5.8% ammonium solution, dried at 110°C and calcined at 700°C. The beads obtained had an apparent density of 0.52 g/ml and a crushing strength of 2 kg.

EXAMPLE 2

The procedure described in Example 1 was repeated except that an aqueous mixture containing 1% of acrylic acid was used. The beads obtained after calcination had an apparent density of 0.6 g/ml and a crushing strength of 5 kg.

EXAMPLE 3

The procedure described in Example 1 was repeated except that an aqueous mixture containing 2% of acrylic acid was used. The beads obtained after calcination had an apparent density of 0.55 g/ml and a crushing strength of 4.5 kg.

EXAMPLE 4

The procedure described in Example 2 was repeated except that acrylamide and glyoxal were substituted for the dihydroxyethylene-bis-acrylamide. The beads were recovered at the bottom of the column containing oil and were aged in a 5.6% ammomium solution. The beads were dried and calcined at 700°C and had an apparent density of 0.54 g/ml and a crushing strength of 2.9 kg.

EXAMPLE 5

The procedure described in Example 1 was repeated to prepare an aqueous mixture containing alumina hydrogel, 8% (based on Al$_2$O$_3$); alumina hydrosol, 2% (based on Al$_2$O$_3$); acrylamide, 3%; ammonium persulphate, 0.3%; and sodium bisulphite, 0.03%. This mixture was injected dropwise at the bottom of a column containing Phenoclor DP4 (chlorinated diphenyl sold by PROGIL S. A. and having a density of 1.39 at 100°C) heated at 95°C. The beads were recovered from the surface of the liquid. Thereafter they were aged in a 5.6% ammonium solution for 12 hours, dried at 110°C and calcined at 700°C. The beads obtained had an apparent density of 0.64 g/ml and a crushing strength of 1.7 kg.

EXAMPLE 6

The procedure described in Example 1 was repeated, with an aqueous mixture containing alumina hydrogel, 6% (based on $Al_2O_3$); alumina hydrosol, 4% (based on $Al_2O_3$); acrylic acid, 1.5%; dihydroxyethylene-bis-acrylamide, 0.075%; ammonium persulphate, 0.083%; and sodium bisulphite, 0.0083%. The final calcined beads had an apparent density of 0.59 g/ml and a crushing strength of 3.2 kg.

EXAMPLE 7

The procedure described in Example 6 was repeated except tht the starting aqueous mixture contained 1.25% of acrylic acid and 0.25% of acrylonitrile instead of 1.50% of acrylic acid. The calcined beads had the same characteristics as those of the beads obtained in Example 6.

EXAMPLE 8

A mixture was prepared containing 3.18 g. of alumina hydrogel containing 21% of water with 2.85 g. of alumina hydrosol containing 11.4% of aluminium together with 19 g. of water. This mixture was heaeated a 95°C for one hour. After cooling to this mixture was added an amount of water equal to the amount of evaporated water. While stirring, a solution containing 35.5% of acrylamide and formaldehyde in a molar ratio of ½ base on acrylamide, and 3 ml of a 10% ammonium persulphate solution together with 1.5 ml. of a 2% sodium bisulphite solution were added to the mixture. The resulting mixture was injected dropwise into a column containing paraffinic oil heated at 99°C. Beads were formed and recovered, waterwashed, dried at 120°C and calcined at 500°C. The calcined beads had an apparent density of 0.54 g/ml. and a crushing strength of 1.1 kg.

EXAMPLE 9

An aqueous mixture was prepared containing 2.52 g. of alumina hydrogel containing 21% of water with 6.0 g. of alumina hydrosol containing 10.56% of aluminium together with 15 g. of water. This mixture was heated at 95°C during one hour. While stirring, to the mixture was added 1.6 ml. of a solution containing 63.3% of acrylic acid and 3.17% of dihydroxyethylene-bis-acrylamide, and 2 ml. of a 10% ammonium persulphate solution together with 1 ml. of a 2% sodium bisulphite solution. This resulting mixture was subjected to a low pressure in order to inject it dropwise into a column containing paraffinic oil heated at 102°C. Beads were recovered, waterwashed, aged in a 5.6% ammonium solution for 12 hours, and thereafter dried and calcined. The calcined beads had an apparent density of 0.53 g/ml. and a crushing strength of 1.2 kg.

EXAMPLE 10

The procedure described in Example 9 was repeated except that a solution containing 46.3% of methacrylic acid and 17% of ethyleneglycol monomethacrylate was used. The calcined beads had an apparent density of 0.49 g/ml. and a crushing strength of 1.3 kg.

EXAMPLE 11

An aqueous mixture was prepared containing the following:

| | |
|---|---|
| alumina hydrogel | 16.8% (based on $Al_2O_3$) |
| alumina hydrosol | 3.2% (based on $Al_2O_3$) |
| N-hydroxymethylacrylamide | 3.8% |
| dihydroxyethylene-bis-acrylamide | 0.185% |
| ammonium persulphate | 0.15% |
| sodium bisulphite | 0.015% |

Otherwise, the procedure described in Example 1 was repeated. The beads obtained after calcination were successively impregnated with a zinc nitrate solution and with a chromium nitrate solution. Thereafter, they were dried and calcined. The impregnated beads consisted of alumina containing zinc oxide and chromium oxide in a ratio of ZnO to $CrO_3$ of 1 : 1. This catalyst was found useful for methanol synthesis from CO and $H_2$.

EXAMPLE 12

An aqueous mixture was prepared containing alumina hydrogel, 12.6% (based on $Al_2O_3$); alumina hydrosol, 3.2% (based on $Al_2O3$); acrylic acid, 2.1%; dihydroxyethylene-bis-acrylamide, 0.25%; ammonium persulphate, 0.94%; and sodium bisulphite, 0.094%. This mixture was injected dropwise into a column containing oil heated at 95°C. The beads formed were recovered, dried and calcined as in Example 1. Thereafter these beads were impregnated with an ammonium chromate solution in order to obtain, after calcination, $Al_2O_3$ catalyst beads containing 20% by weight of $Cr_2O_3$. Cyclohexane was dehydrogenated in the presence of this catalyst at a pressure of 20 atmospheres and at a temperature of 480°C. Benzene was obtained in substantially a 100% yield.

EXAMPLE 13

Alumina hydrogel was prepared by hydrolyzing alumina isopropylate and thereafter the precipitate was dried at 110°C. The following aqueous mixture was then prepared:

| | |
|---|---|
| alumina hydrogel | 16% (based on $Al_2O_3$) |
| alumina hydrosol | 2% (based on $Al_2O_3$) |
| acrylamide | 5.2% |
| glyoxal | 0.25% |
| ammonium persulphate | 0.57% |
| sodium bisulphite | 0.057% |

The beads were recovered at the bottom of the column, waterwashed, aged in isopropanol for three hours, dried at 110°C and calcined at 700°C. The beads were then dipped in a chloroplatinic acid solution, dried and calcined in order to obtain a catalyst in the form of beads containing 0.4% of platinium. This catalyst was used to perform the catalytic reforming of a naphtha, at a temperature of 550°C and at a pressure of 3.5 kg/cm2. The following results were obtained:

| | Before reforming | After reforming |
|---|---|---|
| Boiling range (°C) | 130 – 195°C | 78 – 210°C |
| Octane index (with 3 cm3 of lead tetraethyl) | 71 | 91 |

EXAMPLE 14

This example shows the use of another redox system which consists of $H_2O_2$ and hydrazin chlorhydrate. In this example 99.5 g of alumina hydrogel (20.4% water), precipitated with aluminium sulphate at pH = 9, seven times washed with water and twice with isopropanol, dried at 110°C and finally crushed, were mixed with 95.2 g of alumina hydrosol and with 750 g of water. This mixture was heated at 115°C during an hour and a half, and thereafter cooled. The evaporated water was replaced. To 25 g of this mixture was added one ml of a solution containing 60% of acrylic acid and 3% of a cross-linking agent consisting of glyoxal and acrylamide in a molar ratio of 1 : 2. Next was added 1.3 ml of a 10% oxygenated water solution and 1.3 ml of a 10% hydrazine chlorhydrate solution. The oil drop was carried out at 98°C. The recovered beads were water-washed, dried with an air current and calcined at 700°C. The beads had an apparent density of 0.6 g/ml and a crushing strength of 1.5 kg.

EXAMPLE 15

Example 1 was repeated except as follows: 672.4 g of alumina hydrogel (97.5 g. $Al_2O_3$) were mixed with 11.84 g. $AlCl_3$ and 257 g. $H_2O$. 20 g. of acrylic acid, 8.3 g of an aqueous solution containing 10% of ammonium persulphate and 4.2 g. of a 2% solution of $NaHSO_3$ were then added. The oil drop was carried out, while bubbling air into the feed vessel. The dried and calcined beads had a crushing resistance of 3.1 kg and an apparent density of 0.81 g/ml.

What is claimed is:

1. A process for preparing alumina beads from alumina hydrogel and alumina hydrosol comprising
    a. preparing an aqueous mixture containing from 5–30% by weight alumina in the form of alumina hydrogel and alumina hydrosol in a weight ratio of hydrogel to hydrosol of between 99:1 and 50:50 and from 0.25–20% by weight of a water-soluble acrylic monomer which is polymerizable to an uncross-linked water-soluble polymer or an uncross-linked gel polymer, said acrylic monomer being of the formula

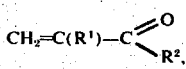

wherein $R^1$ is selected from a group consisting of —H and —$CH_3$ and $R^2$ is selected from the group consisting of —$OR^3$ and —$NR^3R^4$, wherein $R^3$ and $R^4$ are selected from the group consisting of —H and a hydrophylic radical,
    b. dispersing said aqueous mixture as droplets into a substantially water-immiscible fluid having a temperature of 50°–105°C. at atmospheric pressure to effect polymerization of said aqueous mixture,
    c. maintaining said droplets in said fluid until individual hard beads are formed, and
    d. drying and calcining said beads.

2. The process of claim 1 wherein said radical is a hydroxyalkyl radical containing particularly 1 or 2 carbon atoms or a methoxymethyl radical.

3. The process of claim 1 wherein said aqueous mixture contains 7.5 to 20% by weight of alumina hydrogel and hydrosol mixture.

4. The process of claim 1 wherein the amount of said monomer corresponds to about 5 to 150% of the weight of said alumina hydrogel and hydrosol mixture.

5. The process of claim 1 wherein said polymerization of said aqueous mixture is performed by dispersing said aqueous mixture in the form of droplets and by passing said droplets in counter-current flow to a dry hot gas.

6. The process of claim 1 wherein said polymerization of said aqueous mixture is performed by dispersing said aqueous mixture in the form of droplets at the bottom of a column containing a liquid having a density higher than that of said beads, and recovering said beads from the surface of said liquid.

7. The process of claim 1 wherein the weight ratio is between 85 : 15 and 55 : 45.

8. The process of claim 1 wherein said polymerization of said aqueous mixture is performed by dispersing said aqueous mixture in the form of droplets at the head of a column containing a liquid having a density lower than that of said beads, and recovering said beads at the bottom of said column.

9. The process of claim 1 wherein said aqueous mixture contains additionally from 0.05 to 2% by weight of polymerization catalyst for said monomer.

10. The process of claim 1 wherein said 0.25%–20% water-soluble acrylic monomer includes a minor amount of water-soluble monomer which is polymerizable to an uncross-linked water-insoluble polymer.

* * * * *